United States Patent
Mitani

(10) Patent No.: US 12,397,727 B2
(45) Date of Patent: Aug. 26, 2025

(54) POWER SUPPLY SYSTEM, AND MOVING OBJECT INCLUDING POWER SUPPLY SYSTEM

(71) Applicant: HONDA MOTOR CO., LTD., Tokyo (JP)

(72) Inventor: Manabu Mitani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/618,014

(22) Filed: Mar. 27, 2024

(65) Prior Publication Data

US 2024/0326727 A1    Oct. 3, 2024

(51) Int. Cl.
*B60R 16/03*    (2006.01)
*H02J 3/38*    (2006.01)
*B64D 35/021*    (2024.01)

(52) U.S. Cl.
CPC ........... *B60R 16/03* (2013.01); *H02J 3/38* (2013.01); *B64D 35/021* (2024.01); *B64D 2221/00* (2013.01)

(58) Field of Classification Search
CPC .......... B60R 16/03; H02J 3/38; B64D 35/021; B64D 2221/00
See application file for complete search history.

(56) References Cited

U.S. PATENT DOCUMENTS

| | | |
|---|---|---|
| 4,551,632 A | 11/1985 | Jourdan et al. |
| 2020/0274386 A1* | 8/2020 | Kirleis ............... H02J 7/0029 |
| 2022/0204173 A1* | 6/2022 | Barraco .................. H02J 3/32 |
| 2023/0253820 A1* | 8/2023 | Mitani .................... B60L 3/04 |
| | | 307/23 |
| 2023/0312117 A1* | 10/2023 | Tsutsumi .............. B60L 50/60 |
| | | 244/17.13 |
| 2023/0312118 A1* | 10/2023 | Kita ...................... B64D 31/18 |
| | | 244/17.13 |
| 2023/0411958 A1* | 12/2023 | Long ..................... B60L 58/21 |
| 2024/0039292 A1* | 2/2024 | Aguilera Medina ... H02J 1/082 |
| 2024/0198854 A1* | 6/2024 | Jeon ...................... B64U 50/34 |
| 2024/0199217 A1* | 6/2024 | Saito ..................... H02J 7/0014 |
| 2025/0083572 A1* | 3/2025 | Spagnolo ................ H02J 7/34 |
| 2025/0096580 A1* | 3/2025 | Saito .................. H02J 7/00308 |

FOREIGN PATENT DOCUMENTS

JP    6-3975 B2    1/1994
WO    2020/217007 A1    10/2020

* cited by examiner

*Primary Examiner* — Daniel Cavallari
(74) *Attorney, Agent, or Firm* — Rankin, Hill & Clark LLP

(57) ABSTRACT

A first relay device, a second relay device, a third relay device, a fourth relay device, and a first connection device of a power supply system are disposed in areas different from each other.

7 Claims, 9 Drawing Sheets

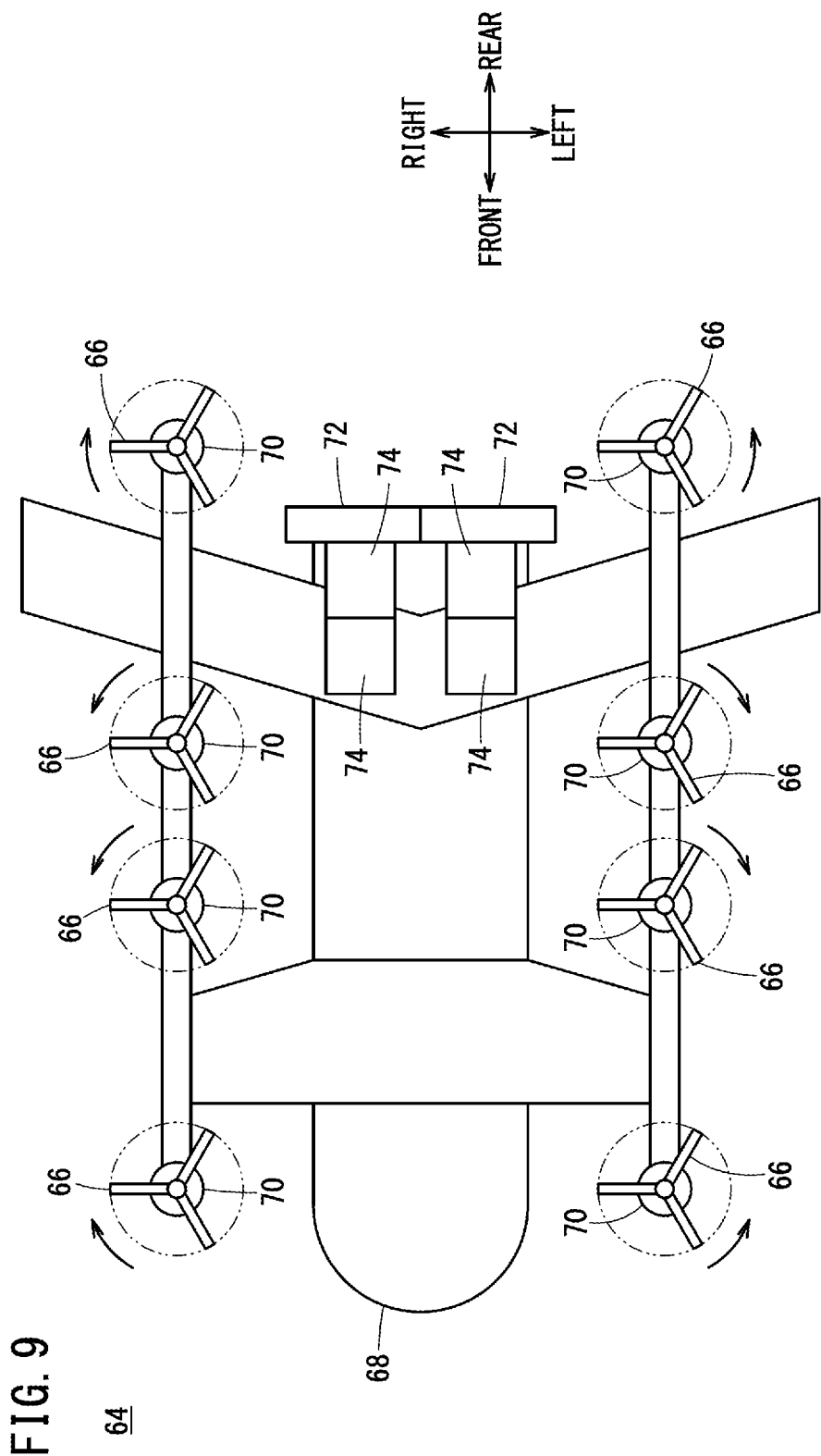

POWER SUPPLY SYSTEM, AND MOVING OBJECT INCLUDING POWER SUPPLY SYSTEM

CROSS-REFERENCE TO RELATED APPLICATIONS

This application is based upon and claims the benefit of priority from Japanese Patent Application No. 2023-056890 filed on Mar. 31, 2023, the contents of which are incorporated herein by reference.

BACKGROUND OF THE INVENTION

Field of the Invention

The present invention relates to a power supply system, and a moving object including the power supply system.

Description of the Related Art

In recent years, research and development have been conducted on electrification technology that contributes to energy efficiency in order to ensure that more people have access to affordable, reliable, sustainable and modern energy.

JP H06-003975 B discloses a power supply system for an aircraft, which can supply electric power to a load even in an emergency by combining a plurality of generators and storage batteries.

SUMMARY OF THE INVENTION

There has been a demand for a power supply system with more redundancy, and a moving object including such a power supply system.

The present invention has the object of solving the aforementioned problem.

A power supply system of the present invention comprises: a first power supply circuit configured to supply, to a first load device, direct current electric power output from a first power generation device; a first power storage device connected to the first power supply circuit in parallel with the first power generation device; a second power supply circuit configured to supply, to a second load device, direct current electric power output from a second power generation device; a second power storage device connected to the second power supply circuit in parallel with the second power generation device; a first relay device including a first partial circuit that is a part of the first power supply circuit, and also including a first contactor device configured to disconnect the first power storage device from the first partial circuit; a second relay device including a second partial circuit that is another part of the first power supply circuit, and also including a second contactor device configured to disconnect the first power generation device from the first partial circuit; a third relay device including a third partial circuit that is a part of the second power supply circuit, and also including a third contactor device configured to disconnect the second power storage device from the third partial circuit; a fourth relay device including a fourth partial circuit that is another part of the second power supply circuit, and also including a fourth contactor device configured to disconnect the second power generation device from the third partial circuit; and a first connection circuit including a first connection device configured to connect the first partial circuit and the third partial circuit to each other, wherein the first relay device, the second relay device, the third relay device, the fourth relay device, and the first connection device are disposed in a plurality of areas different from each other.

A moving object of the present invention comprises the above-described power supply system.

According to the present invention, it is possible to provide a power supply system with more redundancy, and a moving object including such a power supply system.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 9 is a schematic view of a moving object.

DETAILED DESCRIPTION OF THE INVENTION

In the power supply system, it is desired that, even if an abnormality occurs in the periphery of one component or in one component itself, the abnormality does not affect the peripheral components. Electric devices are required to have a redundant power supply system that can continue operating even when an abnormality occurs.

First Embodiment

[Configuration of Power Supply System]

Figure 1:
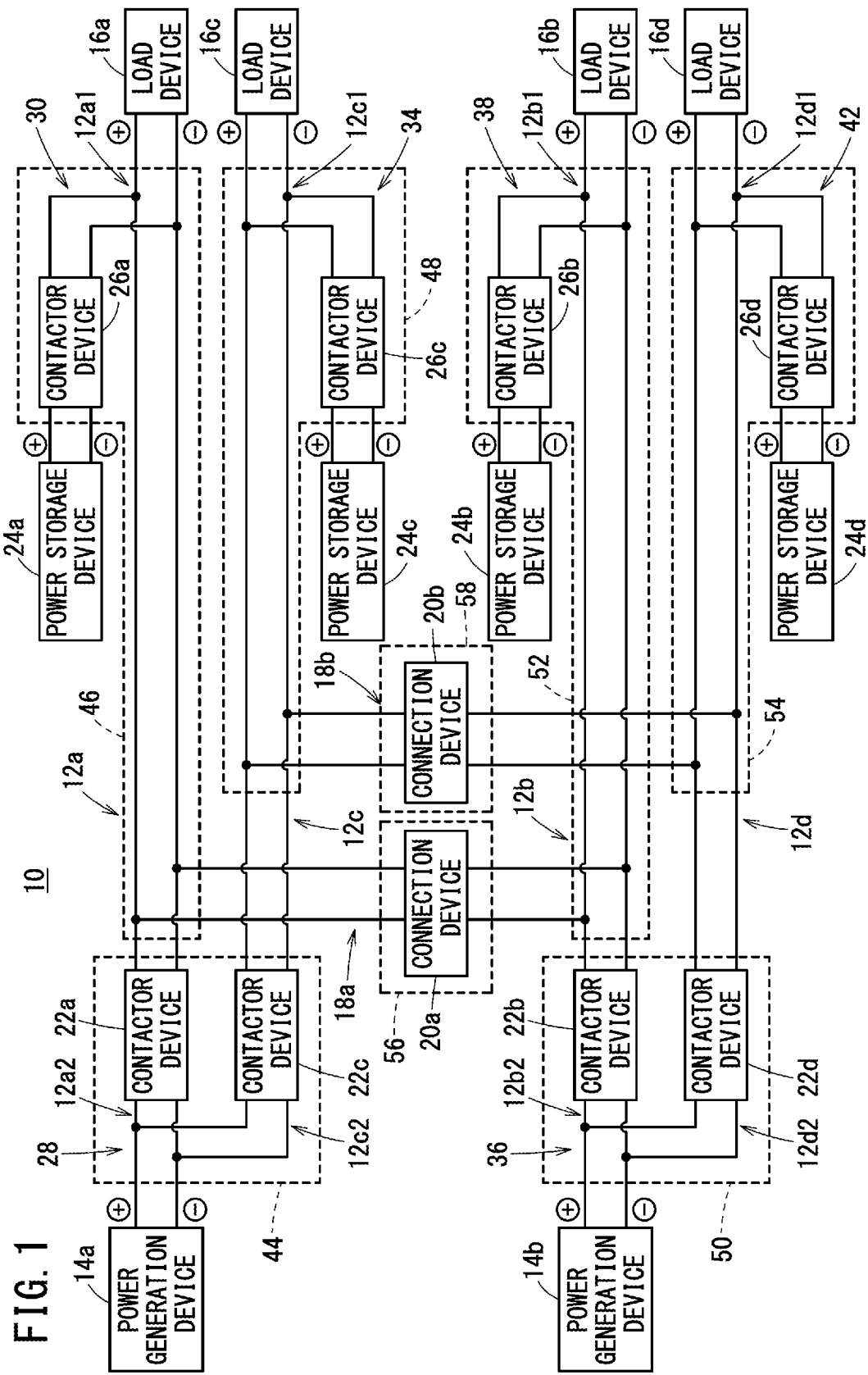
FIG. 1 is a first schematic view of a power supply system.

A power supply system 10 of a first embodiment will be described with reference to the drawings. FIG. 1 is a first schematic view of the power supply system 10.

The power supply system 10 includes a first power supply circuit 12a, a second power supply circuit 12b, a third power supply circuit 12c, and a fourth power supply circuit 12d. The first power supply circuit 12a supplies, to a first load device 16a, DC power output from a first power generation device 14a. The second power supply circuit 12b supplies, to a second load device 16b, DC power output from a second power generation device 14b. The third power supply circuit 12c supplies, to a third load device 16c, the DC power output from the first power generation device 14a. The fourth power supply circuit 12d supplies, to a fourth load device 16d, the DC power output from the second power generation device 14b.

The first power supply circuit 12a includes a partial circuit 12a2 (a second partial circuit) and a partial circuit 12a1 (a first partial circuit) between the first power generation device 14*a* and the first load device 16*a*. For example, the partial circuit 12*a*2 and the partial circuit 12*a*1 are each provided in a distribution board or a junction box. The partial circuit 12*a*2 and the partial circuit 12*a*1 are connected to each other. The partial circuit 12*a*2 is connected to the first power generation device 14*a*. On the other hand, the partial circuit 12*a*1 is connected to the first load device 16*a*. The partial circuit 12*a*2 and the partial circuit 12*a*1 relay DC power between the first power generation device 14*a* and the first load device 16*a*. Hereinafter, a device including the partial circuit 12*a*2 and a contactor device 22*a* (a second contactor device) to be described later is referred to as a relay device 28 (a second relay device). Similarly, a device including the partial circuit 12*a*1 and a contactor device 26*a* (a first contactor device) to be described later is referred to as a relay device 30 (a first relay device).

The second power supply circuit 12*b* includes a partial circuit 12*b*2 (a fourth partial circuit) and a partial circuit 12*b*1 (a third partial circuit) between the second power generation device 14*b* and the second load device 16*b*. For example, the partial circuit 12*b*2 and the partial circuit 12*b*1 are each provided in a distribution board or a junction box. The partial circuit 12*b*2 and the partial circuit 12*b*1 are connected to each other. The partial circuit 12*b*2 is connected to the second power generation device 14*b*. On the other hand, the partial circuit 12*b*1 is connected to the second load device 16*b*. The partial circuit 12*b*2 and the partial circuit 12*bl* relay DC power between the second power generation device 14*b* and the second load device 16*b*. Hereinafter, a device including the partial circuit 12*b*2 and a contactor device 22*b* (a fourth contactor device) to be described later is referred to as a relay device 36 (a fourth relay device). Similarly, a device including the partial circuit 12*b*1 and a contactor device 26*b* (a third contactor device) to be described later is referred to as a relay device 38 (a third relay device).

The third power supply circuit 12*c* includes a partial circuit 12*c*2 (a seventh partial circuit) and a partial circuit 12*c*1 (a fifth partial circuit) between the first power generation device 14*a* and the third load device 16*c*. For example, the partial circuit 12*c*2 and the partial circuit 12*c*1 are each provided in a distribution board or a junction box. The partial circuit 12*c*2 and the partial circuit 12*c*1 are connected to each other. The partial circuit 12*c*2 is connected to the first power generation device 14*a*. On the other hand, the partial circuit 12*c*1 is connected to the third load device 16*c*. The partial circuit 12*c*2 and the partial circuit 12*c*1 relay DC power between the first power generation device 14*a* and the third load device 16*c*. Hereinafter, a device including the partial circuit 12*c*1 and a contactor device 26*c* (a fifth contactor device) to be described later is referred to as a relay device 34 (a fifth relay device). On the other hand, the partial circuit 12*c*2 and a contactor device 22*c* (a seventh contactor device) to be described later are included in the relay device 28.

The fourth power supply circuit 12*d* includes a partial circuit 12*d*2 (an eighth partial circuit) and a partial circuit 12*d*1 (a sixth partial circuit) between the second power generation device 14*b* and the fourth load device 16*d*. For example, the partial circuit 12*d*2 and the partial circuit 12*d*1 are each provided in a distribution board or a junction box. The partial circuit 12*d*2 and the partial circuit 12*d*1 are connected to each other. The partial circuit 12*d*2 is connected to the second power generation device 14*b*. On the other hand, the partial circuit 12*d*1 is connected to the fourth load device 16*d*. The partial circuit 12*d*2 and the partial circuit 12*d*1 relay DC power between the second power generation device 14*b* and the fourth load device 16*d*. Hereinafter, a device including the partial circuit 12*d*1 and a contactor device 26*d* (a sixth contactor device) to be described later is referred to as a relay device 42 (a sixth relay device). On the other hand, the partial circuit 12*d*2 and a contactor device 22*d* (an eighth contactor device) to be described later are included in the relay device 36.

The first power generation device 14*a* and the second power generation device 14*b* each include an engine, a generator, and a power control unit (all of them not shown). The engine drives the generator, and the generator generates three-phase AC power. The power control unit converts the three-phase AC power into DC power.

The first power generation device 14*a* and the second power generation device 14*b* may each include various sensors such as a voltage sensor and a current sensor. Further, the first power generation device 14*a* and the second power generation device 14*b* may each include elements such as a fuse, a relay, a breaker, a diode, a transistor, a resistor, a coil, and a capacitor.

The first load device 16*a*, the second load device 16*b*, the third load device 16*c*, and the fourth load device 16*d* each include an inverter and an electric motor (both of them not shown). The inverter converts the input DC power into three-phase AC power, and the electric motor is driven by the three-phase AC power. The first load device 16*a*, the second load device 16*b*, the third load device 16*c*, and the fourth load device 16*d* may each include a DC/DC converter and a low-voltage drive device (both of them not shown). The DC/DC converter lowers the voltage of the input DC power, and the low-voltage drive device is driven by the DC power.

The first load device 16*a*, the second load device 16*b*, the third load device 16*c*, and the fourth load device 16*d* may each include various sensors such as a voltage sensor and a current sensor. Further, the first load device 16*a*, the second load device 16*b*, the third load device 16*c*, and the fourth load device 16*d* may each include elements such as a fuse, a relay, a breaker, a diode, a transistor, a resistor, a coil, and a capacitor.

The power supply system 10 includes a first connection circuit 18*a*. One end of the first connection circuit 18*a* is connected to the partial circuit 12*a*1 of the first power supply circuit 12*a*. The other end of the first connection circuit 18*a* is connected to the partial circuit 12*b*1 of the second power supply circuit 12*b*. The first connection circuit 18*a* includes a first connection device 20*a*. The first connection device 20*a* can connect the partial circuit 12*a*1 and the partial circuit 12*b*1.

The power supply system 10 includes a second connection circuit 18*b*. One end of the second connection circuit 18*b* is connected to the partial circuit 12*c*1 of the third power supply circuit 12*c*. The other end of the second connection circuit 18*b* is connected to the partial circuit 12*d*1 of the fourth power supply circuit 12*d*. The second connection circuit 18*b* includes a second connection device 20*b*. The second connection device 20*b* can connect the partial circuit 12*c*1 and the partial circuit 12*d*1.

The first connection device 20*a* and the second connection device 20*b* each include a contactor. The contactor may be configured by a relay or a semiconductor switch. The first connection device 20*a* and the second connection device 20*b* may each further include a breaker.

Normally, the connection between the first power supply circuit 12*a* and the second power supply circuit 12*b* is cut off. Thus, when an electrical abnormality occurs in one of the first power supply circuit 12*a* or the second power supply circuit 12b, the other of the first power supply circuit 12a and the second power supply circuit 12b can be prevented from being affected by the abnormality. For example, when an overcurrent occurs in one of the first power supply circuit 12a or the second power supply circuit 12b, the overcurrent is prevented from flowing to the other of the first power supply circuit 12a and the second power supply circuit 12b.

Similarly, the connection between the third power supply circuit 12c and the fourth power supply circuit 12d is normally cut off. Thus, when an electrical abnormality occurs in one of the third power supply circuit 12c or the fourth power supply circuit 12d, the other of the third power supply circuit 12c and the fourth power supply circuit 12d can be prevented from being affected by the abnormality. For example, when an overcurrent occurs in one of the third power supply circuit 12c or the fourth power supply circuit 12d, the overcurrent is prevented from flowing to the other of the third power supply circuit 12c and the fourth power supply circuit 12d.

When the supply of electric power from the first power generation device 14a to the first power supply circuit 12a and the third power supply circuit 12c is cut off, the first power supply circuit 12a and the second power supply circuit 12b are connected by the first connection device 20a. Further, the third power supply circuit 12c and the fourth power supply circuit 12d are connected by the second connection device 20b. As a result, electric power is supplied from the second power generation device 14b to the first power supply circuit 12a and the third power supply circuit 12c.

When the supply of electric power from the second power generation device 14b to the second power supply circuit 12b and the fourth power supply circuit 12d is cut off, the first power supply circuit 12a and the second power supply circuit 12b are connected by the first connection device 20a. Further, the third power supply circuit 12c and the fourth power supply circuit 12d are connected by the second connection device 20b. As a result, electric power is supplied from the first power generation device 14a to the second power supply circuit 12b and the fourth power supply circuit 12d.

The power supply system 10 includes the contactor devices 22a to 22d. The contactor device 22a is disposed in the partial circuit 12a2 of the relay device 28. The contactor device 22a can disconnect the first power generation device 14a from the partial circuit 12a1 and the first connection circuit 18a. The contactor device 22b is disposed in the partial circuit 12b2 of the relay device 36. The contactor device 22b can disconnect the second power generation device 14b from the partial circuit 12b1 and the first connection circuit 18a. The contactor device 22c is disposed in the partial circuit 12c2 of the relay device 28. The contactor device 22c can disconnect the first power generation device 14a from the partial circuit 12c1 and the second connection circuit 18b. The contactor device 22d is disposed in the partial circuit 12d2 of the relay device 36. The contactor device 22d can disconnect the second power generation device 14b from the partial circuit 12d1 and the second connection circuit 18b.

The contactor devices 22a to 22d each include a contactor. The contactor may be configured by a relay or a semiconductor switch. The contactor devices 22a to 22d may each include a breaker.

The power supply system 10 includes a first power storage device 24a, a second power storage device 24b, a third power storage device 24c, and a fourth power storage device 24d. The first power storage device 24a is connected to the first power supply circuit 12a in parallel with the first power generation device 14a. The second power storage device 24b is connected to the second power supply circuit 12b in parallel with the second power generation device 14b. The third power storage device 24c is connected to the third power supply circuit 12c in parallel with the first power generation device 14a. The fourth power storage device 24d is connected to the fourth power supply circuit 12d in parallel with the second power generation device 14b.

The first power storage device 24a, the second power storage device 24b, the third power storage device 24c, and the fourth power storage device 24d each include a lithium ion battery. The first power storage device 24a, the second power storage device 24b, the third power storage device 24c, and the fourth power storage device 24d may each include a secondary battery other than the lithium ion battery. The first power storage device 24a, the second power storage device 24b, the third power storage device 24c, and the fourth power storage device 24d may each include a large-capacity capacitor.

The first power storage device 24a, the second power storage device 24b, the third power storage device 24c, and the fourth power storage device 24d may each include various sensors such as a voltage sensor and a current sensor. The first power storage device 24a, the second power storage device 24b, the third power storage device 24c, and the fourth power storage device 24d may each include elements such as a fuse, a relay, a breaker, a diode, a transistor, a resistor, a coil, and a capacitor.

The power supply system 10 includes the contactor devices 26a to 26d. The contactor device 26a is included in the relay device 30. The contactor device 26a is disposed on a wire connecting the first power storage device 24a and the partial circuit 12a1. The contactor device 26a can disconnect the first power storage device 24a from the partial circuit 12a1. The contactor device 26b is included in the relay device 38. The contactor device 26b is disposed on a wire connecting the second power storage device 24b and the partial circuit 12b1. The contactor device 26b can disconnect the second power storage device 24b from the partial circuit 12b1. The contactor device 26c is included in the relay device 34. The contactor device 26c is disposed on a wire connecting the third power storage device 24c and the partial circuit 12c1. The contactor device 26c can disconnect the third power storage device 24c from the partial circuit 12c1. The contactor device 26d is included in the relay device 42. The contactor device 26d is disposed on a wire connecting the fourth power storage device 24d and the partial circuit 12d1. The contactor device 26d can disconnect the fourth power storage device 24d from the partial circuit 12d1.

The contactor devices 26a to 26d each include a contactor. The contactor may be configured by a relay or a semiconductor switch. The contactor devices 26a to 26d may each include a breaker.

The power supply system 10 may include various sensors such as a voltage sensor and a current sensor, in addition to the above-described configuration. The power supply system 10 may include elements such as a fuse, a resistor, a coil, and a capacitor.

[Arrangement of Components of Power Supply System]

Figure 2:
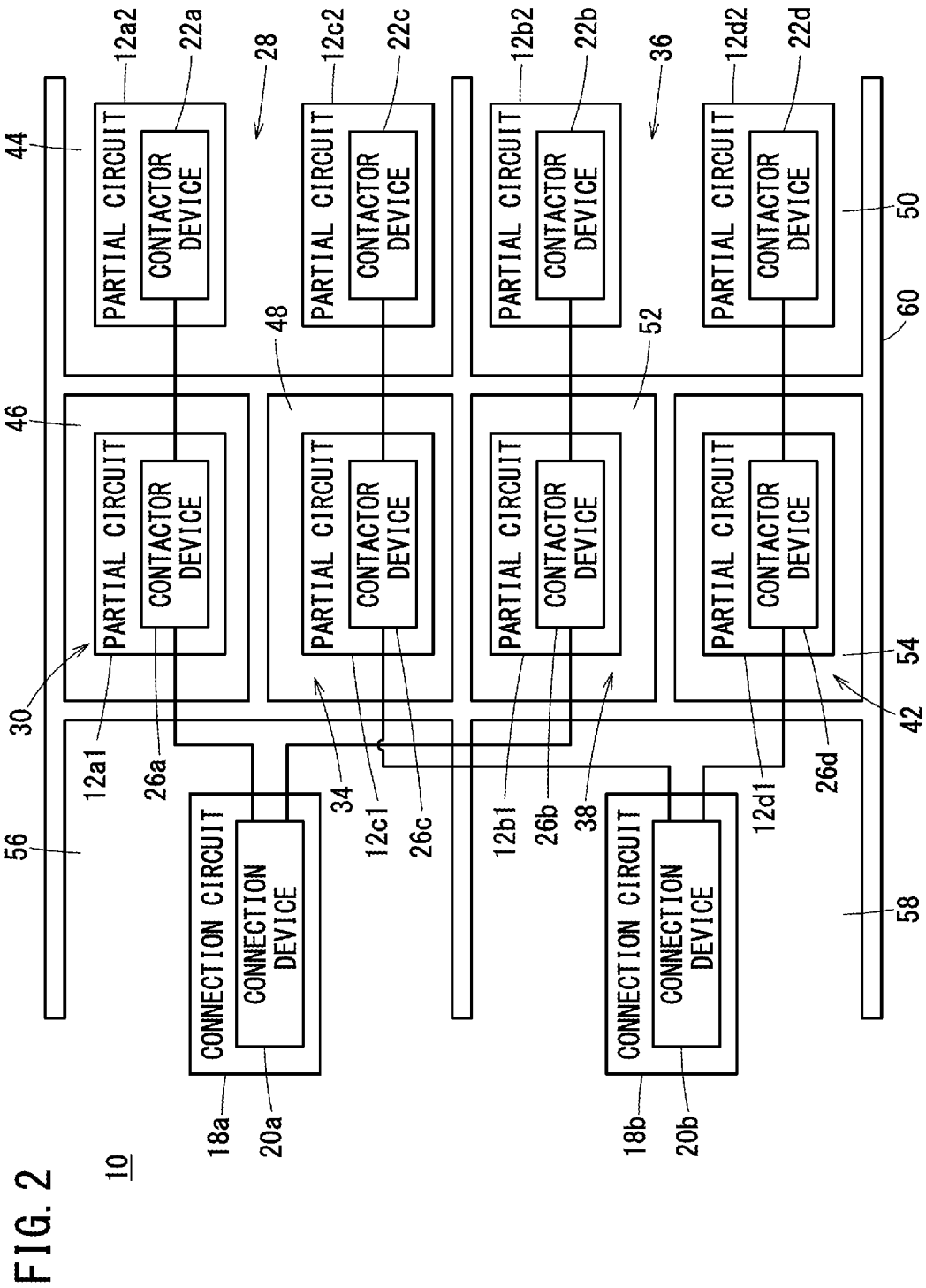
FIG. 2 is a second schematic view of the power supply system.

FIG. 2 is a second schematic view of the power supply system 10. The plurality of components constituting the power supply system 10 are arranged in a distributed manner in a plurality of areas 44, 46, 48, 50, 52, 54, 56, and 58. Specifically, the relay device 28, the relay device 30, the relay device 34, the relay device 36, the relay device 38, the relay device 42, the first connection device 20a, and the second connection device 20b are disposed in areas different from each other.

The relay device 28 is disposed in an area 44 (a second area). The relay device 30 is disposed in an area 46 (a first area). The relay device 34 is disposed in an area 48 (a sixth area). The relay device 36 is disposed in an area 50 (a fourth area). The relay device 38 is disposed in an area 52 (a third area). The relay device 42 is disposed in an area 54 (a seventh area). The first connection device 20a (the first connection circuit 18a) is disposed in an area 56 (a fifth area). The second connection device 20b (the second connection circuit 18b) is disposed in an area 58 (an eighth area).

The areas 44, 46, 48, 50, 52, 54, 56, and 58 are partitioned from each other by partitions 60. For example, two areas adjacent to each other, such as the area 44 and the area 46 shown in FIG. 2, may be partitioned by a common partition 60. Further, the areas 44, 46, 48, 50, 52, 54, 56, and 58 may be partitioned by partitions 60 different from each other. The partition 60 is preferably made of a flame-retardant material, but the material is not limited thereto.

[Operation of Power Supply System in Normal State]

Figure 3:
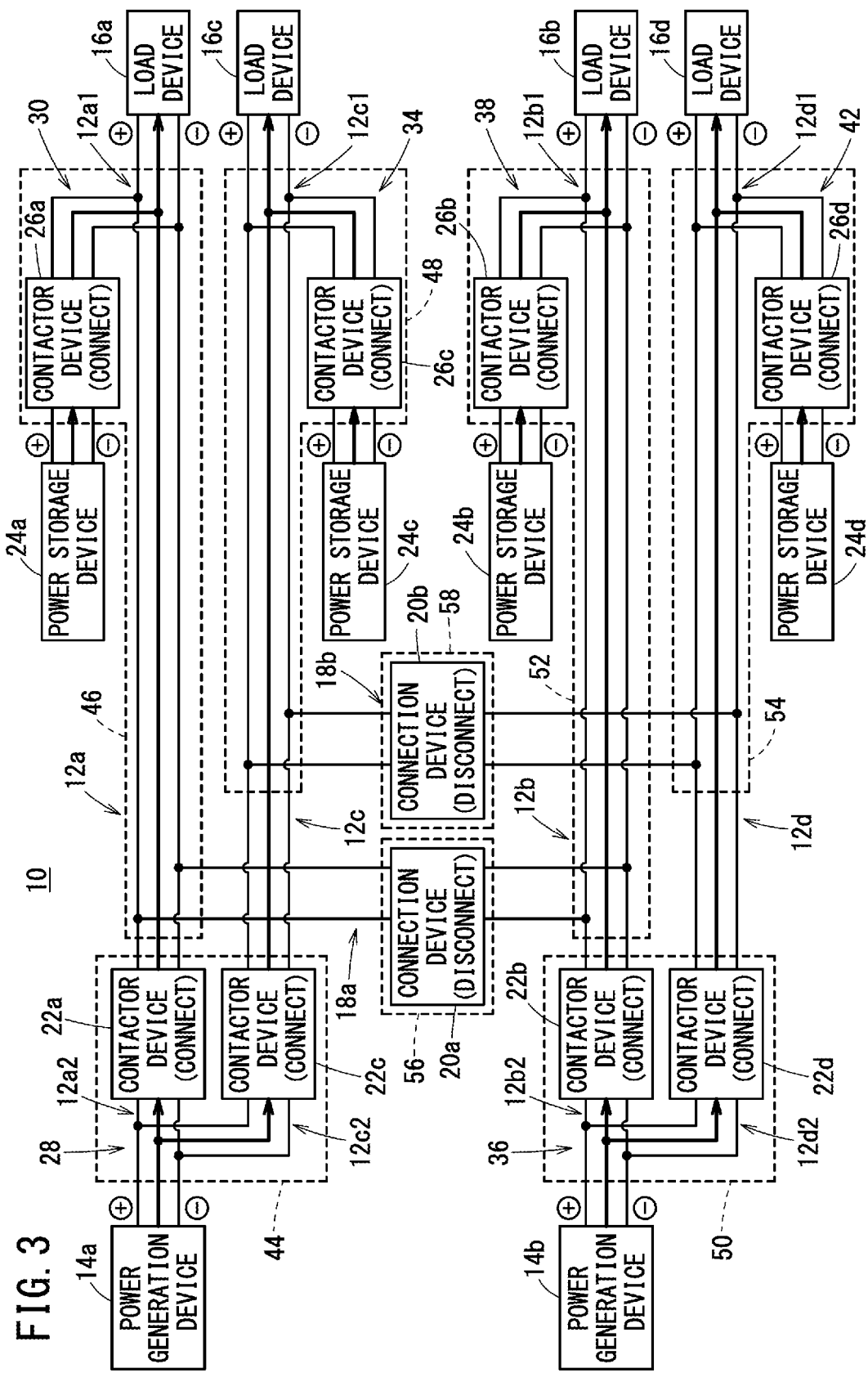
FIG. 3 is a diagram showing the operation of the power supply system in a normal state.

FIG. 3 is a diagram showing the operation of the power supply system 10 in a normal state. Arrows shown in FIG. 3 indicate electric power supply paths.

The first power generation device 14a is connected to the partial circuit 12a1 and the first connection circuit 18a by the contactor device 22a. The first power generation device 14a is connected to the partial circuit 12c1 and the second connection circuit 18b by the contactor device 22c. As a result, electric power is supplied from the first power generation device 14a to the first load device 16a and the third load device 16c. The second power generation device 14b is connected to the partial circuit 12b1 and the first connection circuit 18a by the contactor device 22b, and the second power generation device 14b is connected to the partial circuit 12d1 and the second connection circuit 18b by the contactor device 22d. As a result, electric power is supplied from the second power generation device 14b to the second load device 16b and the fourth load device 16d.

The first power storage device 24a is connected to the first load device 16a by the contactor device 26a, and electric power is supplied from the first power storage device 24a to the first load device 16a. The second power storage device 24b is connected to the second load device 16b by the contactor device 26b, and electric power is supplied from the second power storage device 24b to the second load device 16b. The third power storage device 24c is connected to the third load device 16c by the contactor device 26c, and electric power is supplied from the third power storage device 24c to the third load device 16c. The fourth power storage device 24d is connected to the fourth load device 16d by the contactor device 26d, and electric power is supplied from the fourth power storage device 24d to the fourth load device 16d.

The connection between the partial circuit 12a1 of the first power supply circuit 12a and the partial circuit 12b1 of the second power supply circuit 12b is interrupted by the first connection device 20a. The connection between the partial circuit 12c1 of the third power supply circuit 12c and the partial circuit 12d1 of the fourth power supply circuit 12d is interrupted by the second connection device 20b.

[Operation of Power Supply System when First Abnormality Occurs]

Figure 4:
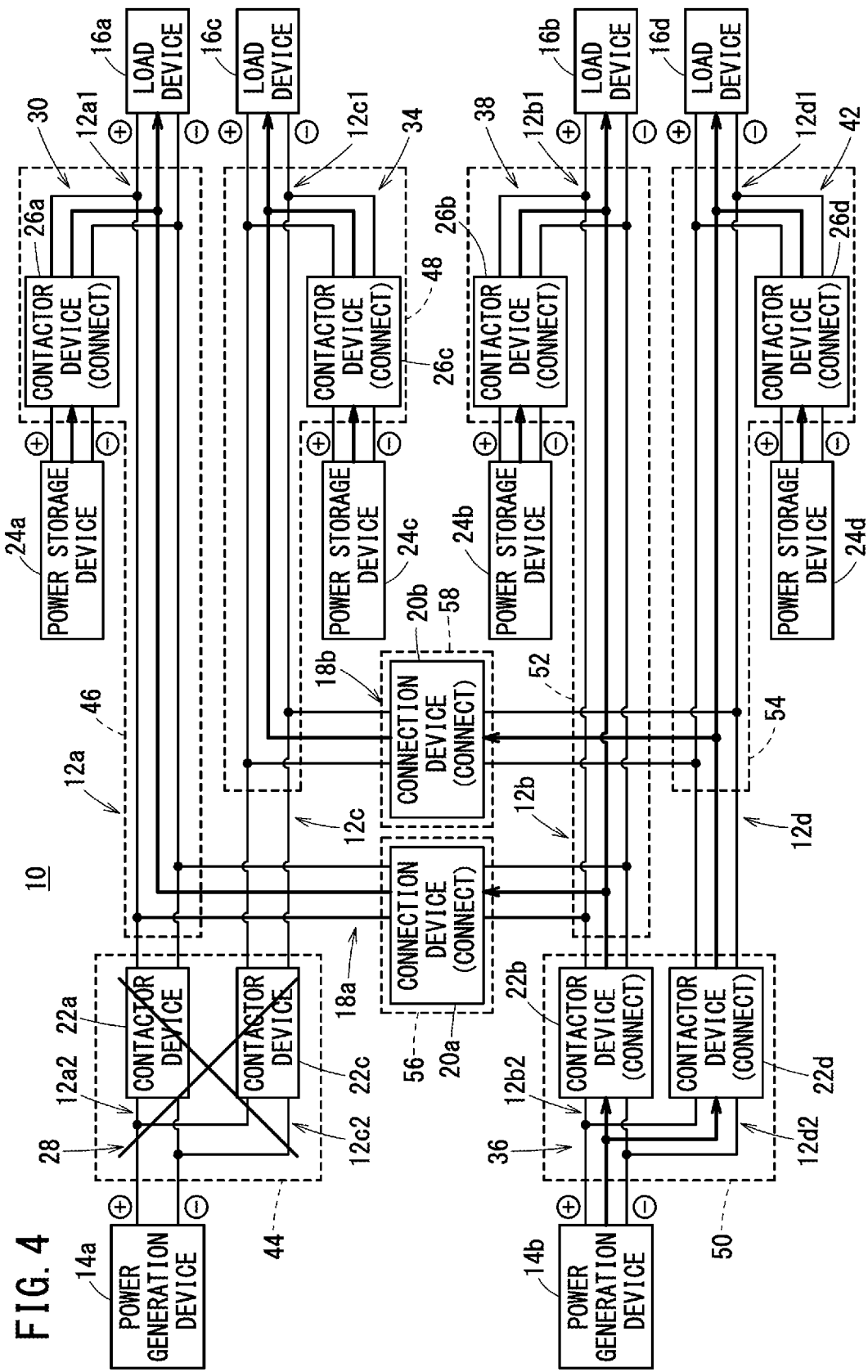
FIG. 4 is a diagram showing the operation of the power supply system when a first abnormality occurs.

FIG. 4 is a diagram showing the operation of the power supply system 10 when a first abnormality occurs. The arrows indicated by the thick lines in FIG. 4 indicate electric power supply paths. FIG. 4 shows the operation of the power supply system 10 in a case where the supply of electric power from the first power generation device 14a to the first power supply circuit 12a and the third power supply circuit 12c is cut off.

When an abnormality occurs in the area 44 in which the relay device 28 is disposed, the relay device 28 may fail. When the relay device 28 fails, the supply of electric power from the first power generation device 14a to the first load device 16a and the third load device 16c is cut off. In this case, the first power storage device 24a supplies electric power to the first load device 16a, and the third power storage device 24c supplies electric power to the third load device 16c. However, the first load device 16a and the third load device 16c may not be operated for a long time only by the first power storage device 24a and the third power storage device 24c.

In the present embodiment, the area 44 is partitioned by the partition 60 shown in FIG. 2. Therefore, the abnormality that has occurred in the area 44 does not affect the components outside the area 44. Accordingly, the components outside the area 44 can operate normally. Therefore, the electric power supply paths by the remaining power sources can be secured in the power supply system 10. Consequently, the operation of the power supply system 10 can be continued. According to the present embodiment, it is possible to provide the power supply system 10 with more redundancy.

When an abnormality shown in FIG. 4 occurs, the partial circuit 12a1 of the first power supply circuit 12a and the partial circuit 12b1 of the second power supply circuit 12b are connected by the first connection device 20a. As a result, electric power is supplied from the second power generation device 14b to the first load device 16a. Further, the partial circuit 12c1 of the third power supply circuit 12c and the partial circuit 12d1 of the fourth power supply circuit 12d are connected by the second connection device 20b. As a result, electric power is supplied from the second power generation device 14b to the third load device 16c. Therefore, the first load device 16a and the third load device 16c can be operated.

[Operation of Power Supply System when Second Abnormality Occurs]

Figure 5:
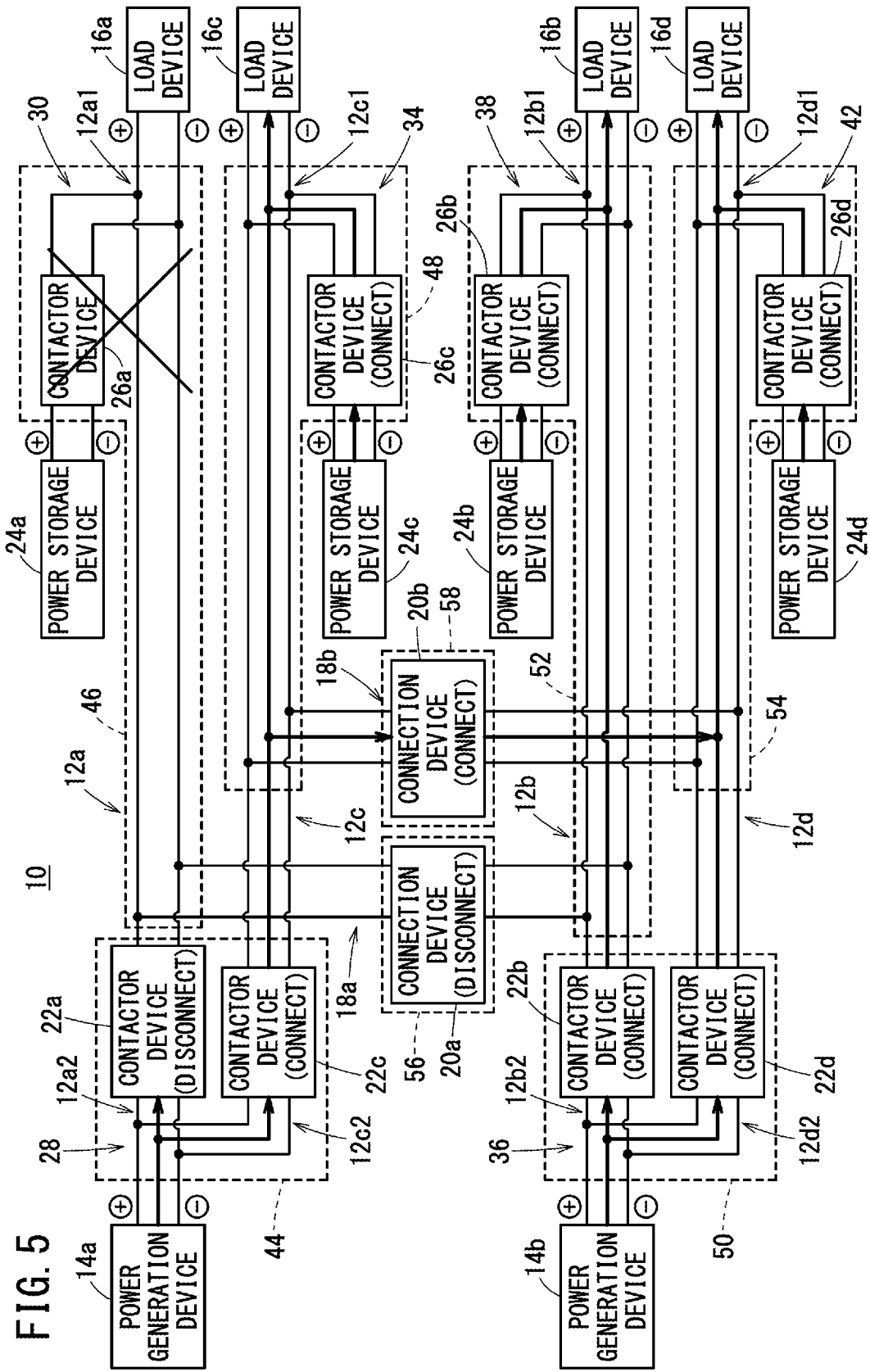
FIG. 5 is a diagram showing the operation of the power supply system when a second abnormality occurs.

FIG. 5 is a diagram showing the operation of the power supply system 10 when a second abnormality occurs. The arrows indicated by the thick lines in FIG. 5 indicate electric power supply paths. FIG. 5 shows the operation of the power supply system 10 in a case where the supply of electric power from the first power generation device 14a and the first power storage device 24a to the first load device 16a is cut off.

When an abnormality occurs in the area 46 in which the relay device 30 is disposed, the relay device 30 may fail. When the relay device 30 fails, the supply of electric power from the first power generation device 14a and the first power storage device 24a to the first load device 16a is cut off. In this case, the electric power generated by the first power generation device 14a is used only by the third load device 16c. Then, the electric power used by the first load device 16a is left, out of the electric power generated by the first power generation device 14a.

In the present embodiment, the area 46 is partitioned by the partition 60 shown in FIG. 2. Therefore, the abnormality that has occurred in the area 46 does not affect the components outside the area 46. Accordingly, the components outside the area 46 can operate normally.

In the case of the abnormality shown in FIG. 5, the partial circuit 12c1 of the third power supply circuit 12c and the partial circuit 12d1 of the fourth power supply circuit 12d are connected by the second connection device 20b disposed in the area 58. As a result, electric power is supplied from the first power generation device 14a to the fourth load device 16d. Therefore, the electric power generated by the first power generation device 14a is used not only by the third load device 16c but also by the fourth load device 16d. Accordingly, the surplus of the electric power generated by the first power generation device 14a can be effectively utilized.

[Operation of Power Supply System when Third Abnormality Occurs]

Figure 6:
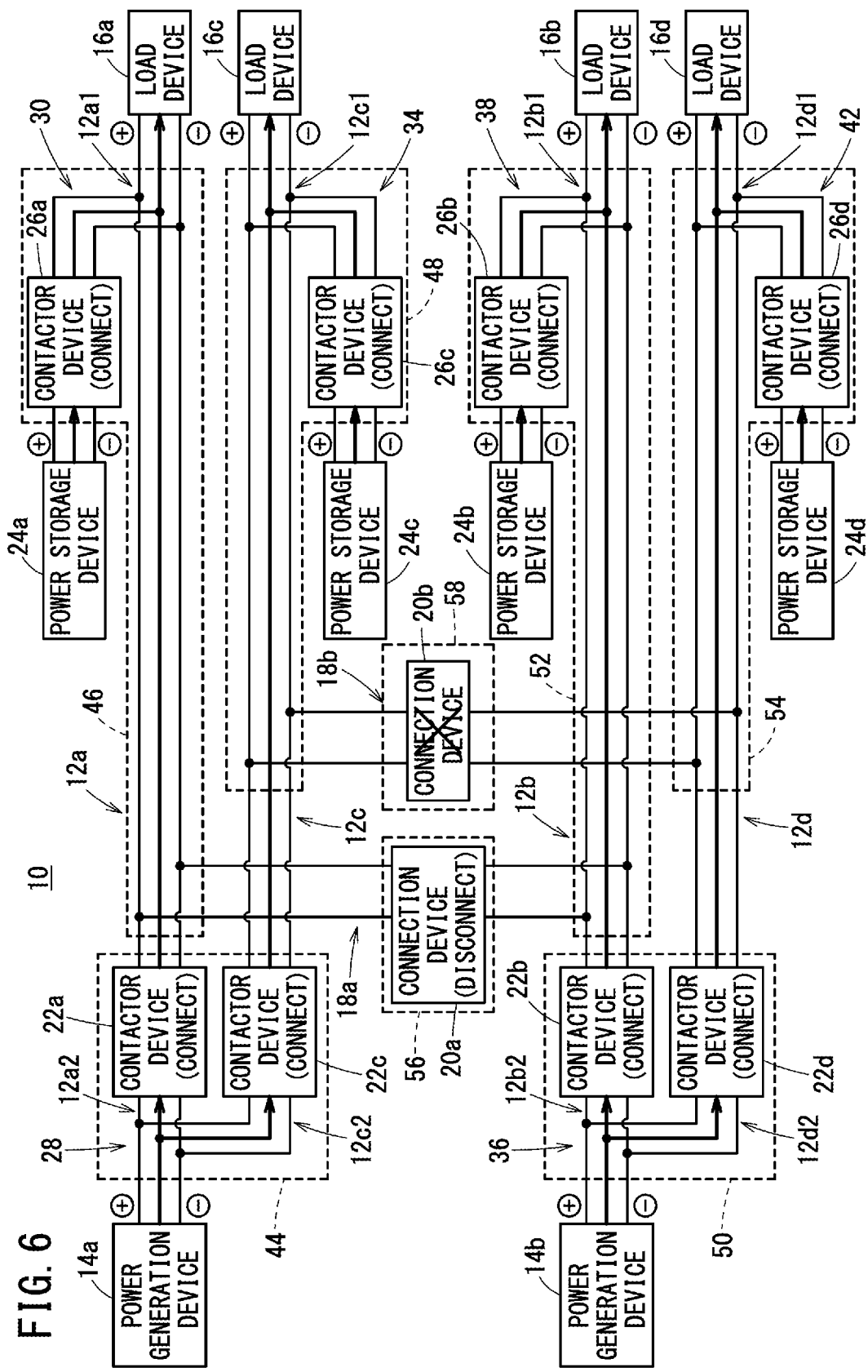
FIG. 6 is a diagram showing the operation of the power supply system when a third abnormality occurs.

FIG. 6 is a diagram showing the operation of the power supply system 10 when a third abnormality occurs. The arrows indicated by the thick lines in FIG. 6 indicate electric power supply paths. FIG. 6 shows the operation of the power supply system 10 when the second connection device 20b fails.

When an abnormality occurs in the area 58 in which the second connection device 20b is disposed, the second connection device 20b may fail. When the second connection device 20b fails, electric power cannot be supplied from the third power supply circuit 12c to the fourth power supply circuit 12d, and electric power cannot be supplied from the fourth power supply circuit 12d to the third power supply circuit 12c.

In the present embodiment, the area 58 is partitioned by the partition 60 shown in FIG. 2. Therefore, the abnormality that has occurred in the area 58 does not affect the components outside the area 58. Accordingly, the components outside the area 58 can operate normally.

When the abnormality shown in FIG. 6 occurs, the power supply system 10 can operate in the same manner as it operates in the normal state shown in FIG. 3.

[Modification]

Figure 7:
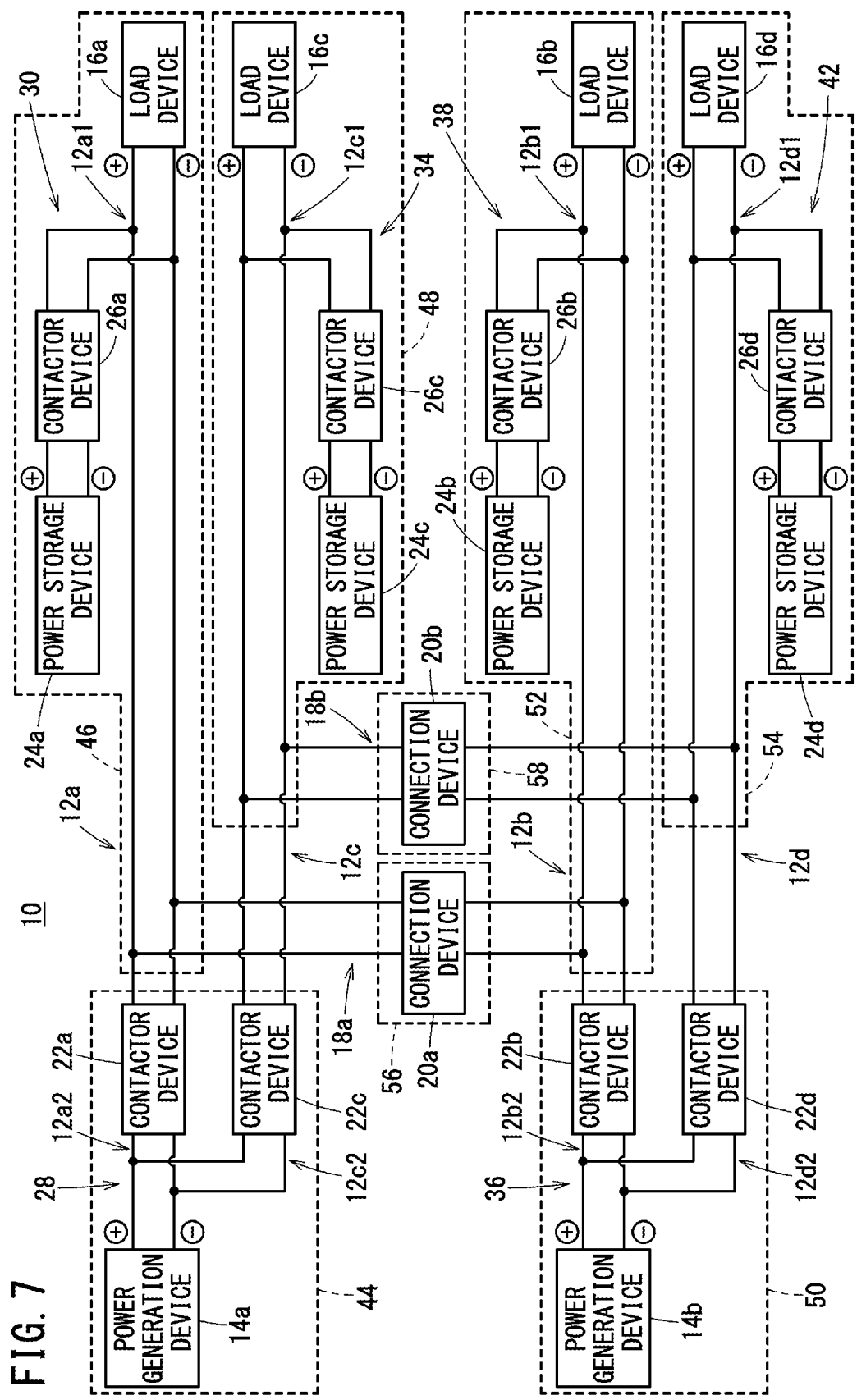
FIG. 7 is a schematic view of a first modification of the power supply system.

FIG. 7 is a schematic view of a first modification of the power supply system 10. As shown in FIG. 7, the first power generation device 14a may be disposed in the area 44. The second power generation device 14b may be disposed in the area 50. At least one of the first power storage device 24a or the first load device 16a may be disposed in the area 46. At least one of the second power storage device 24b or the second load device 16b may be disposed in the area 52. At least one of the third power storage device 24c or the third load device 16c may be disposed in the area 48. At least one of the fourth power storage device 24d or the fourth load device 16d may be disposed in the area 54.

In this manner, at least one of the first power generation device 14a, the second power generation device 14b, the first load device 16a, the second load device 16b, the third load device 16c, the fourth load device 16d, the first power storage device 24a, the second power storage device 24b, the third power storage device 24c, or the fourth power storage device 24d may be disposed in the area together with the relay device.

Figure 8:
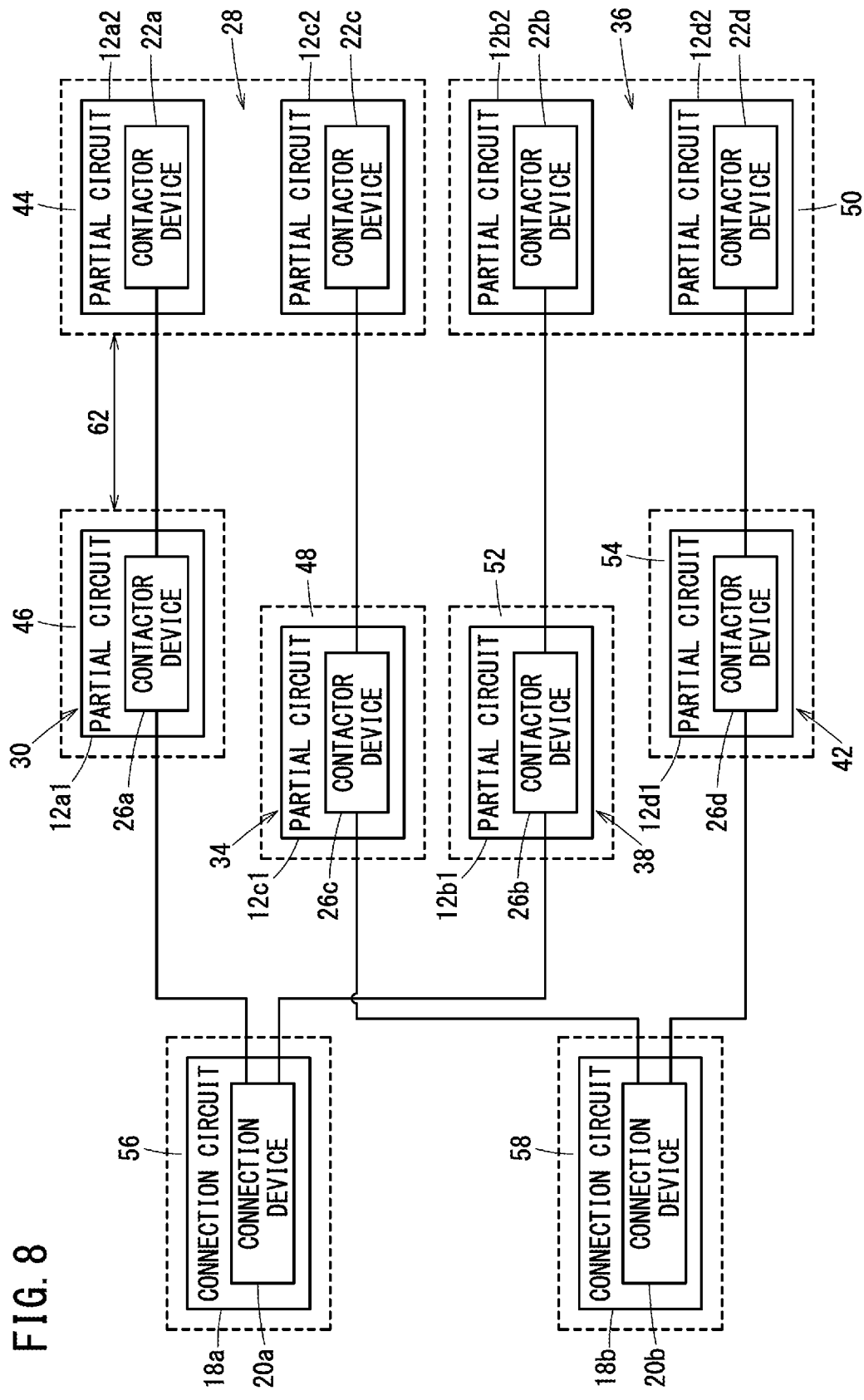
FIG. 8 is a schematic view of a second modification of the power supply system.

FIG. 8 is a schematic view of a second modification of the power supply system 10. As shown in FIG. 8, the areas 44, 46, 48, 50, 52, 54, 56, and 58 may be spaced apart from each other by a predetermined distance or more. In this case, a gap 62 having the predetermined distance or more is provided between two areas adjacent to each other. The predetermined distance is set in advance so that an abnormality that has occurred in one of two adjacent areas does not affect the other.

In the present embodiment, two load devices and two power storage devices are connected to one power generation device. However, the present invention is not limited thereto. For example, one load device and one power storage device may be connected to one power generation device. Further, three or more load devices and three or more power storage devices may be connected to one power generation device. In addition, the power supply system 10 may include three or more combinations of one power generation device, one or more load devices, and one or more power storage devices.

Second Embodiment

FIG. 9 is a schematic view of a moving object 64. The power supply system 10 is mounted on the moving object 64.

The moving object 64 of the present embodiment is an electric vertical take-off and landing aircraft (eVTOL aircraft). The moving object 64 includes eight VTOL rotors 66. The VTOL rotors 66 generate upward thrust for a fuselage 68. The moving object 64 includes eight electric motors 70. One electric motor 70 drives one VTOL rotor 66. The moving object 64 includes two cruise rotors 72. The cruise rotors 72 generate forward thrust for the fuselage 68. The moving object 64 includes four electric motors 74. Two electric motors 74 drive one cruise rotor 72.

Each of the first load device 16a, the second load device 16b, the third load device 16c, and the fourth load device 16d may include two electric motors 70 and one electric motor 74. Each of the first load device 16a, the second load device 16b, the third load device 16c, and the fourth load device 16d may include a low-voltage drive device in addition to the electric motors 70 and the electric motor 74.

The moving object 64 is not limited to an aircraft, and may be a ship, an automobile, a train, or the like.

APPENDICES

The following notes (appendices) are further disclosed in relation to the above-described embodiments.

Appendix 1

The power supply system (10) includes: the first power supply circuit (12a) configured to supply, to the first load device (16a), DC power output from the first power generation device (14a); the first power storage device (24a) connected to the first power supply circuit in parallel with the first power generation device; the second power supply circuit (12b) configured to supply, to the second load device (16b), DC power output from the second power generation device (14b); the second power storage device (24b) connected to the second power supply circuit in parallel with the second power generation device; the first relay device (30) including the first partial circuit (12a1) that is a part of the first power supply circuit, and also including the first contactor device (26a) configured to disconnect the first power storage device from the first partial circuit; the second relay device (28) including the second partial circuit (12a2) that is another part of the first power supply circuit, and also including the second contactor device (22a) configured to disconnect the first power generation device from the first partial circuit; the third relay device (38) including the third partial circuit (12b1) that is a part of the second power supply circuit, and also including the third contactor device (26b) configured to disconnect the second power storage device from the third partial circuit; the fourth relay device (36) including the fourth partial circuit (12*b*2) that is another part of the second power supply circuit, and also including the fourth contactor device (22*b*) configured to disconnect the second power generation device from the third partial circuit; and the first connection circuit (18*a*) including the first connection device (20*a*) configured to connect the first partial circuit and the third partial circuit to each other, wherein the first relay device, the second relay device, the third relay device, the fourth relay device, and the first connection device are disposed in a plurality of areas (44, 46, 50, 52, 56) different from each other.

According to the above configuration, an abnormality that has occurred in a certain area does not affect the components outside the area. Therefore, the components outside the area in which the abnormality has occurred can operate normally. For example, electric power supply paths by the remaining power sources can be secured in the power supply system. That is, according to the above configuration, it is possible to provide the power supply system 10 with more redundancy.

Appendix 2

In the power supply system according to Appendix 1, the plurality of areas may be partitioned from each other by the partition (60).

According to the above configuration, two areas adjacent to each other can be reliably separated. Moreover, according to such a configuration, two areas adjacent to each other can be brought close to each other, and the respective components of the power supply system can be disposed in a concentrated manner.

Appendix 3

In the power supply system according to Appendix 1, the plurality of areas may be spaced apart from each other by a predetermined distance or more.

According to the above configuration, since a member for partitioning the areas is not required, the number of components of the power supply system can be reduced.

Appendix 4

In the power supply system according to any one of Appendices 1 to 3, the first relay device may be disposed in the first area (46) among the plurality of areas, the second relay device may be disposed in the second area (44) among the plurality of areas, the third relay device may be disposed in the third area (52) among the plurality of areas, the fourth relay device may be disposed in the fourth area (50) among the plurality of areas, the first connection device may be disposed in the fifth area (56) among the plurality of areas, the first power generation device may be disposed in the second area (44), the second power generation device may be disposed in the fourth area (50), the first power storage device and the first load device may be disposed in the first area (46), and the second power storage device and the second load device may be disposed in the third area (52).

Appendix 5

The power supply system according to any one of Appendices 1 to 3 may further include: the third power supply circuit (12*c*) configured to supply, to the third load device (16*c*), the DC power output from the first power generation device; the third power storage device (24*c*) connected to the third power supply circuit in parallel with the first power generation device; the fourth power supply circuit (12*d*) configured to supply, to the fourth load device (16*d*), the DC power output from the second power generation device; the fourth power storage device (24*d*) connected to the fourth power supply circuit in parallel with the second power generation device; the fifth relay device (34) including the fifth partial circuit (12*c*1) that is a part of the third power supply circuit, and also including the fifth contactor device (26*c*) configured to disconnect the third power storage device from the fifth partial circuit; the sixth relay device (42) including the sixth partial circuit (12*d*1) that is a part of the fourth power supply circuit, and also including the sixth contactor device (26*d*) configured to disconnect the fourth power storage device from the sixth partial circuit; and the second connection circuit (18*b*) including the second connection device (20*b*) configured to connect the fifth partial circuit and the sixth partial circuit to each other, wherein the second relay device may further include the seventh partial circuit (12*c*2) that is another part of the third power supply circuit, and also include the seventh contactor device (22*c*) configured to disconnect the first power generation device from the fifth partial circuit, the fourth relay device may further include the eighth partial circuit (12*d*2) that is another part of the fourth power supply circuit, and also include the eighth contactor device (22*d*) configured to disconnect the second power generation device from the sixth partial circuit, and the first relay device, the second relay device, the third relay device, the fourth relay device, the fifth relay device, the sixth relay device, the first connection device, and the second connection device may be disposed in the areas different from each other.

Appendix 6

In the power supply system according to Appendix 5, the first relay device may be disposed in the first area (46) among the plurality of areas, the second relay device may be disposed in the second area (44) among the plurality of areas, the third relay device may be disposed in the third area (52) among the plurality of areas, the fourth relay device may be disposed in the fourth area (50) among the plurality of areas, the first connection device may be disposed in the fifth area (56) among the plurality of areas, the fifth relay device may be disposed in the sixth area (48) among the plurality of areas, the sixth relay device may be disposed in the seventh area (54) among the plurality of areas, the second connection device may be disposed in the eighth area (58) among the plurality of areas, the first power generation device may be disposed in the second area (44), the second power generation device may be disposed in the fourth area (50), the first power storage device and the first load device may be disposed in the first area (46), the second power storage device and the second load device may be disposed in the third area (52), the third power storage device and the third load device may be disposed in the sixth area (48), and the fourth power storage device and the fourth load device may be disposed in the seventh area (54).

Appendix 7

The moving object (64) includes the power supply system according to any one of Appendices 1 to 6.

The present invention is not limited to the above disclosure, and various modifications are possible without departing from the essence and gist of the present invention.

The invention claimed is:

1. A power supply system comprising:
a first power supply circuit configured to supply, to a first load device, direct current electric power output from a first power generation device;
a first power storage device connected to the first power supply circuit in parallel with the first power generation device;
a second power supply circuit configured to supply, to a second load device, direct current electric power output from a second power generation device;
a second power storage device connected to the second power supply circuit in parallel with the second power generation device;
a first relay device including a first partial circuit that is a part of the first power supply circuit, and also including a first contactor device configured to disconnect the first power storage device from the first partial circuit;
a second relay device including a second partial circuit that is another part of the first power supply circuit, and also including a second contactor device configured to disconnect the first power generation device from the first partial circuit;
a third relay device including a third partial circuit that is a part of the second power supply circuit, and also including a third contactor device configured to disconnect the second power storage device from the third partial circuit;
a fourth relay device including a fourth partial circuit that is another part of the second power supply circuit, and also including a fourth contactor device configured to disconnect the second power generation device from the third partial circuit; and
a first connection circuit including a first connection device configured to connect the first partial circuit and the third partial circuit to each other,
wherein the first relay device, the second relay device, the third relay device, the fourth relay device, and the first connection device are disposed in a plurality of areas different from each other.

2. The power supply system according to claim 1, wherein the plurality of areas are partitioned from each other by a partition.

3. The power supply system according to claim 1, wherein the plurality of areas are spaced apart from each other by a predetermined distance or more.

4. The power supply system according to claim 1, wherein
the first relay device is disposed in a first area among the plurality of areas,
the second relay device is disposed in a second area among the plurality of areas,
the third relay device is disposed in a third area among the plurality of areas,
the fourth relay device is disposed in a fourth area among the plurality of areas,
the first connection device is disposed in a fifth area among the plurality of areas,
the first power generation device is disposed in the second area,
the second power generation device is disposed in the fourth area,
the first power storage device and the first load device are disposed in the first area, and
the second power storage device and the second load device are disposed in the third area.

5. The power supply system according to claim 1, further comprising:
a third power supply circuit configured to supply, to a third load device, the direct current electric power output from the first power generation device;
a third power storage device connected to the third power supply circuit in parallel with the first power generation device;
a fourth power supply circuit configured to supply, to a fourth load device, the direct current electric power output from the second power generation device;
a fourth power storage device connected to the fourth power supply circuit in parallel with the second power generation device;
a fifth relay device including a fifth partial circuit that is a part of the third power supply circuit, and also including a fifth contactor device configured to disconnect the third power storage device from the fifth partial circuit;
a sixth relay device including a sixth partial circuit that is a part of the fourth power supply circuit, and also including a sixth contactor device configured to disconnect the fourth power storage device from the sixth partial circuit; and
a second connection circuit including a second connection device configured to connect the fifth partial circuit and the sixth partial circuit to each other,
wherein the second relay device further includes a seventh partial circuit that is another part of the third power supply circuit, and also includes a seventh contactor device configured to disconnect the first power generation device from the fifth partial circuit,
the fourth relay device further includes an eighth partial circuit that is another part of the fourth power supply circuit, and also includes an eighth contactor device configured to disconnect the second power generation device from the sixth partial circuit, and
the first relay device, the second relay device, the third relay device, the fourth relay device, the fifth relay device, the sixth relay device, the first connection device, and the second connection device are disposed in the areas different from each other.

6. The power supply system according to claim 5, wherein
the first relay device is disposed in a first area among the plurality of areas,
the second relay device is disposed in a second area among the plurality of areas,
the third relay device is disposed in a third area among the plurality of areas,
the fourth relay device is disposed in a fourth area among the plurality of areas,
the first connection device is disposed in a fifth area among the plurality of areas,
the fifth relay device is disposed in a sixth area among the plurality of areas,
the sixth relay device is disposed in a seventh area among the plurality of areas,
the second connection device is disposed in an eighth area among the plurality of areas,
the first power generation device is disposed in the second area,
the second power generation device is disposed in the fourth area,
the first power storage device and the first load device are disposed in the first area,
the second power storage device and the second load device are disposed in the third area,
the third power storage device and the third load device are disposed in the sixth area, and the fourth power storage device and the fourth load device are disposed in the seventh area.

7. A moving object comprising the power supply system according to claim 1.

* * * * *